(12) United States Patent
Chumchal

(10) Patent No.: US 12,528,211 B1
(45) Date of Patent: Jan. 20, 2026

(54) FIXED BLADE KNIFE

(71) Applicant: Kyle Chumchal, Fletcher, NC (US)

(72) Inventor: Kyle Chumchal, Fletcher, NC (US)

(73) Assignee: Microtech Knives, Inc., Mills River, NC (US)

(*) Notice: Subject to any disclaimer, the term of this patent is extended or adjusted under 35 U.S.C. 154(b) by 0 days.

(21) Appl. No.: 19/217,622

(22) Filed: May 23, 2025

(51) Int. Cl.
B26B 3/00 (2006.01)
B25G 3/36 (2006.01)

(52) U.S. Cl.
CPC . B26B 3/00 (2013.01); B25G 3/36 (2013.01)

(58) Field of Classification Search
None
See application file for complete search history.

(56) References Cited

U.S. PATENT DOCUMENTS

| D648,414 S | 11/2011 | Wallisch |
| D697,577 S | 1/2014 | Thompson |
| 8,813,367 B1* | 8/2014 | Linn ................. B26B 1/046 30/161 |
| D767,079 S | 9/2016 | Hannan |
| D768,803 S | 10/2016 | Benton et al. |
| D801,469 S | 10/2017 | Mandeville et al. |
| D899,552 S | 10/2020 | Berenji et al. |
| D906,470 S | 12/2020 | Marfione |
| D925,690 S | 7/2021 | Marfione |
| D985,095 S | 5/2023 | Marfione |
| D985,096 S | 5/2023 | Marfione |
| D991,392 S | 7/2023 | Marfione |
| 12,251,849 B1 | 3/2025 | Marfione |
| 2005/0252010 A1* | 11/2005 | Freeman ................. B26B 5/00 30/335 |
| 2016/0375598 A1 | 12/2016 | Singer |
| 2018/0169852 A1 | 6/2018 | Fryer-Biggs et al. |
| 2020/0009755 A1 | 1/2020 | Singer |
| 2020/0391397 A1* | 12/2020 | Cauley, Jr. ............... B25G 3/18 |
| 2021/0402626 A1 | 12/2021 | Heimendinger |
| 2024/0424697 A1 | 12/2024 | Mishina et al. |
| 2025/0073935 A1 | 3/2025 | Lucas, Jr. |

FOREIGN PATENT DOCUMENTS

FR 2569601 A1 * 3/1986 ............... B25G 3/36

OTHER PUBLICATIONS

English translation of FR-2569601-A1, dated Mar. 7, 1986.*
Website, www.bladehq.com, Bear-Son Professional Boning Knife.

* cited by examiner

Primary Examiner — Hwei-Siu C Payer
(74) Attorney, Agent, or Firm — Steve LeBlanc, LLC

(57) ABSTRACT

A fixed blade knife includes a handle having an inner surface. A blade has a tang that extends at least partially along the inner surface of the handle. A bolster extends along at least a portion of the tang and releasably connects to the handle.

17 Claims, 4 Drawing Sheets

FIXED BLADE KNIFE

FIELD OF THE INVENTION

The present invention is directed to a fixed blade knife with a removable bolster to enhance maintenance and customization of the knife.

BACKGROUND OF THE INVENTION

Fixed blade knives are generally considered stronger and more durable than folding knives because a fixed blade knife has a blade that is fixed with respect to a handle or chassis. The blade has a cutting edge on one or both sides and a tang that extends partially or fully through the handle. The handle may be a pair of scales connected to one another through the tang of the blade. Screws may extend through one or both scales to align and securely connect the scales to the tang of the blade and/or to one another, while also facilitating disassembly of the handle when needed to repair or replace the blade or scales.

Some fixed blade knives include a bolster between the cutting edge(s) of the blade and the handle to enhance the balance and control of the knife. The bolster adds weight to the handle portion of the knife and creates a natural stop that facilitates hand placement and grip on the knife when cutting. However, the bolster may also interfere with sharpening the cutting edge(s) of the blade, particularly the portion of the cutting edge(s) near the bolster. Therefore, the need exists for an improved fixed blade knife with a bolster that enhances the control and precision of the knife, reduces interference with sharpening the cutting edge(s) of the blade, and/or allows the bolster to be replaced to customize the knife.

BRIEF DESCRIPTION OF THE INVENTION

Aspects and advantages of the invention are set forth below in the following description, or may be obvious from the description, or may be learned through practice of the invention.

One embodiment of the present invention is a fixed blade knife that includes a first scale having a first scale inner surface and a second scale opposed to the first scale, wherein the second scale has a second scale inner surface. A blade has a tang that extends at least partially between the first scale inner surface and the second scale inner surface. A first bolster extends along at least a portion of the tang and releasably connects to the first scale, and a second bolster extends along at least a portion of the tang and releasably connects to the second scale.

An alternate embodiment of the present invention is a fixed blade knife that includes a handle having an inner surface. A blade has a tang that extends at least partially along the inner surface of the handle. A bolster extends along at least a portion of the tang and releasably connects to the handle.

In yet another embodiment of the present invention, a fixed blade knife includes a handle having an inner surface. A blade has a tang that extends at least partially along the inner surface of the handle, and a bolster extends along at least a portion of the tang. The fixed blade knife further includes a means for releasably connecting the bolster to the handle.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
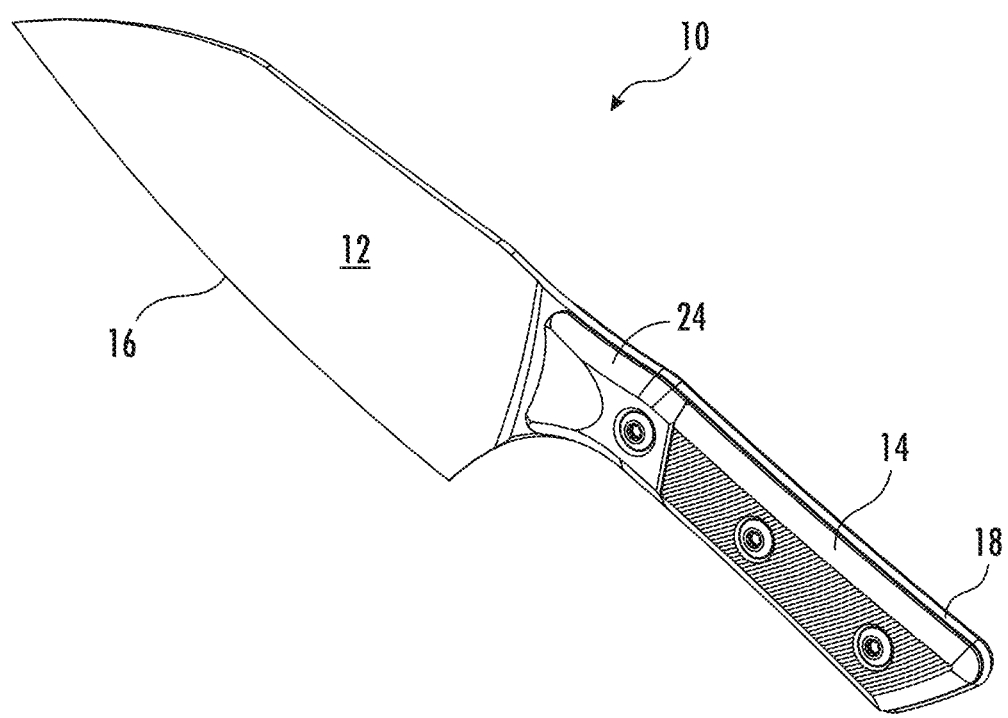
FIG. 1 is a left perspective view of a fixed blade knife according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Embodiments of the present invention generally include a fixed blade knife having one or more cutting edges and a tang that extends at least partially through a handle. A bolster removably connects to the handle to enhance the balance and control of the knife while also facilitating assembly and customization of the knife. As used herein, the term "front" shall mean the end of the knife proximate to the cutting edge(s); the term "rear" shall mean the end of the knife proximate to the tang; and the term "longitudinal" shall refer to the direction along the length of the knife between the front and rear.

Figure 2:
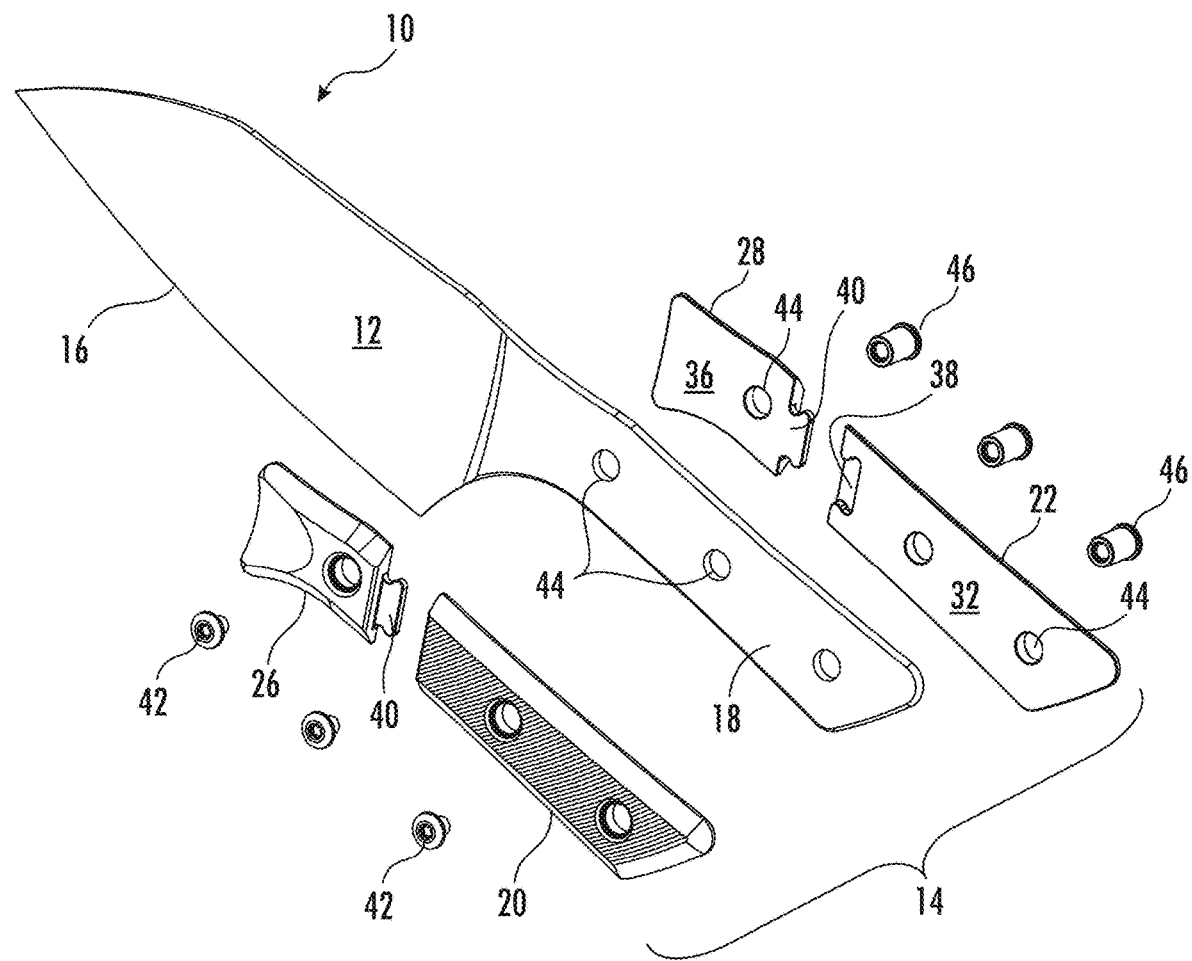
FIG. 2 is an exploded perspective view of the fixed blade knife shown in FIG. 1.

FIG. 1 provides a left perspective view of a fixed blade knife 10 according to one embodiment of the present invention, and FIG. 2 provides an exploded perspective view of the fixed blade knife 10 shown in FIG. 1. As shown in FIGS. 1 and 2, the fixed blade knife 10 generally includes a blade 12 and a handle 14. The blade 12 generally has one or more cutting edges 16 that may be smooth, serrated, or some combination of smooth and serrated. The blade 12 also includes a tang 18 that may extend partially or fully through the handle 14. The handle 14 provides a frame for holding the blade 12 and may be molded, pressed, or machined from plastics, metals, polymers, or any material or combination of materials having the desired strength and durability. The handle 14 may be a single piece construction or may include a first or left scale 20 opposed to a second or right scale 22 on opposite sides of the tang 18.

A bolster 24 extends along at least a portion of the tang 18 and releasably connects to the handle 14. The bolster 24 adds weight to the handle 14 and creates a natural stop that facilitates hand placement and grip on the knife 10 when cutting. As with the handle, the bolster 24 may be a single piece construction or may include a first or left bolster 26 opposed to a second or right bolster 28 on opposite sides of the tang 18.

Figure 3:
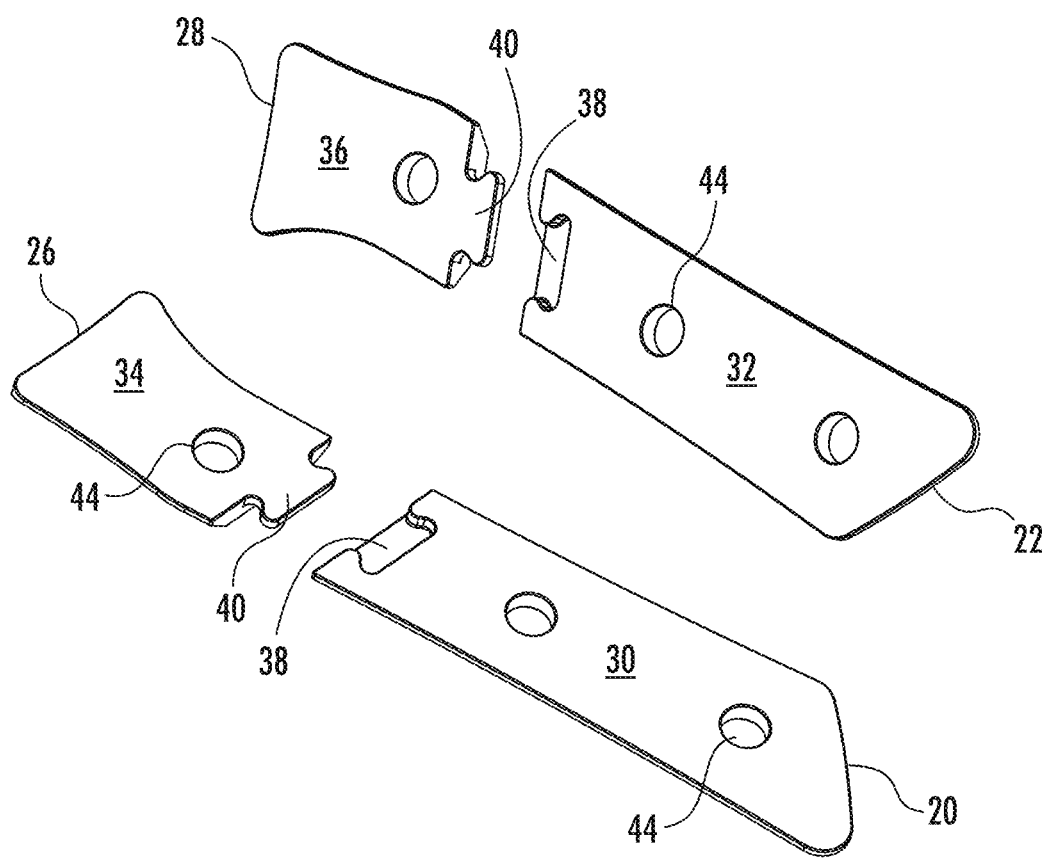
FIG. 3 is a perspective view of the inner surfaces of the left and right scales and bolsters shown in FIGS. 1 and 2.
Figure 4:
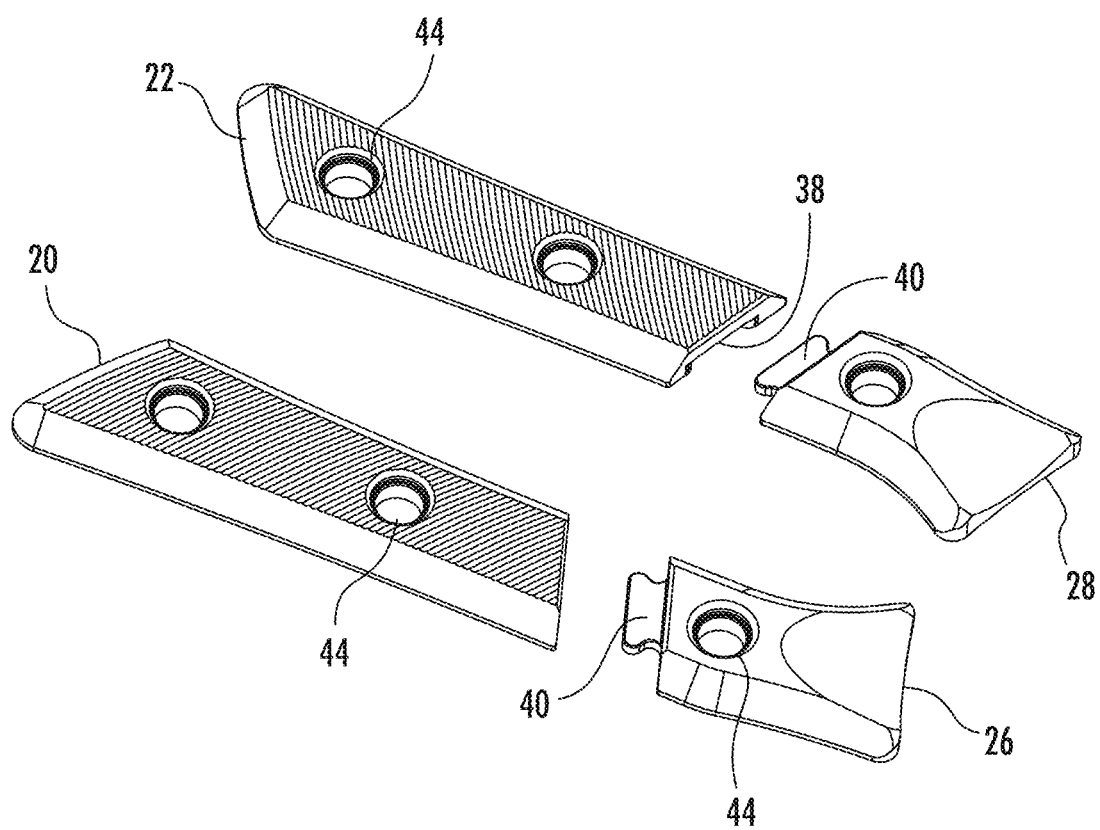
FIG. 4 is a perspective view of the outer surfaces of the left and right scales and bolsters shown in FIGS. 1-3.

FIGS. 3 and 4 provide perspective views of the left and right scales 20, 22 and bolsters 26, 28 shown in FIGS. 1 and 2. As shown most clearly in FIG. 3, the first or left scale 20 has a first scale inner surface 30, and the second or right scale 22 has a second scale inner surface 32. Similarly, the first or left bolster 26 has a first bolster inner surface 34, and the second or right bolster 28 has a second bolster inner surface 36. When assembled together, the inner surfaces 30, 32 of the first and second scales 20, 22 form the inner surface of the handle 14 to sandwich the tang 18 of the blade 12 between the first scale inner surface 30 and the second scale inner surface 32.

As shown in FIGS. 2-4, the fixed blade knife 10 includes a means for releasably connecting the bolster 24 to the handle 14. In particular embodiments, the means for releasably connecting the bolster 24 to the handle 14 may also prevent longitudinal movement of the bolster 24 with respect to the handle 14. The structure for releasably connecting the bolster 24 to the handle 14 may be complementary fittings between the bolster 24 and the handle 14, such as a tongue and groove fitting, a mortise and tenon joint, a dovetail joint, or tab and blank connectors commonly used in puzzle pieces. In the particular embodiment shown in FIGS. 2-4, the structure for releasably connecting the bolster 24 to the handle 14 is a recess 38 in the inner surface of the handle 14 that receives a complementary tab 40 extending from the bolster 24. As best shown in FIGS. 3 and 4, for example, the recesses 38 in the inner surfaces 30, 32 of the first and second scales 20, 22 receive the complementary tabs 40 extending from the inner surfaces 34, 36 of the first and second bolsters 26, 28. In this manner, the first bolster 26 releasably connects to the first scale inner surface 30, and the second bolster 28 releasably connects to the second scale inner surface 32.

The fixed blade knife 10 may further include a means for releasably connecting the handle 14 to the tang 18, the bolster 24 to the tang 18, the first scale 20 to the second scale 22, and/or the first bolster 26 to the second bolster 28. The structure for performing the particular function may include one or more screws or fasteners that releasably engage with the first and/or second scales 20, 22, the first and/or second bolsters 26, 28, and/or the tang 18 of the blade 12. In the particular embodiment shown in FIG. 2, for example, the structure for releasably connecting the various components is one or more screws 42 that extend through apertures 44 in the components to threadingly engage with corresponding collars 46. In this manner, the screws 42 and collars 46 releasably connect the handle 14 to the tang 18, the bolster 24 to the tang 18, the first scale 20 to the second scale 22, and/or the first bolster 26 to the second bolster 28.

The various embodiments described and illustrated in FIGS. 1-4 facilitate removal and re-assembly of the bolster 24 for maintenance, repairs, and customization by simplifying the alignment of the handle 14 and the bolster 24 during re-assembly. In particular embodiments, the releasable connection between the bolster 24 and the handle 14 is hidden from view when the knife 10 is fully assembled.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A fixed blade knife, comprising:
   a first scale, wherein the first scale has a first scale inner surface;
   a recess in the inner surface of the first scale that extends from the inner surface of the first scale partially through the first scale;
   a second scale opposed to the first scale, wherein the second scale has a second scale inner surface;
   a blade, wherein the blade has a tang that extends at least partially between the first scale inner surface and the second scale inner surface;
   a first bolster extends along at least a portion of the tang and releasably connects to the recess in the inner surface of the first scale; and
   a second bolster extends along at least a portion of the tang and releasably connects to the second scale.

2. The fixed blade knife as in claim 1, wherein the second bolster releasably connects to the second scale inner surface.

3. The fixed blade knife as in claim 1, further comprising a tab extending from the first bolster, and the recess in the first scale inner surface releasably couples with the tab extending from the first bolster.

4. The fixed blade knife as in claim 3, wherein the recess in the first scale inner surface releasably couples with the tab extending from the first bolster to prevent longitudinal movement of the first bolster with respect to the first scale.

5. The fixed blade knife as in claim 1, further comprising a means for releasably connecting the first bolster to the second bolster.

6. A fixed blade knife, comprising:
   a handle, wherein the handle has an inner surface;
   a recess in the inner surface of the handle that extends from the inner surface of the handle partially through the handle;
   a blade, wherein the blade has a tang that extends at least partially along the inner surface of the handle; and
   a bolster extends along at least a portion of the tang and releasably connects to the recess in the inner surface of the handle.

7. The fixed blade knife as in claim 6, further comprising a tab extending from the bolster, and the recess in the inner surface of the handle releasably couples with the tab extending from the bolster.

8. The fixed blade knife as in claim 7, wherein the recess in the inner surface of the handle releasably couples with the tab extending from the bolster to prevent longitudinal movement of the bolster with respect to the handle.

9. The fixed blade knife as in claim 6, wherein the handle comprises a left scale and a right scale on opposite sides of the tang.

10. The fixed blade knife as in claim 6, wherein the bolster comprises a left bolster and a right bolster on opposite sides of the tang.

11. The fixed blade knife as in claim 6, further comprising a means for releasably connecting the bolster to the tang of the blade.

12. A fixed blade knife, comprising:
    a handle, wherein the handle has an inner surface;
    a blade, wherein the blade has a tang that extends at least partially along the inner surface of the handle;

a bolster that extends along at least a portion of the tang; and a means for releasably connecting the bolster to the handle, wherein the means for releasably connecting the bolster to the handle comprises a recess in the inner surface of the handle that extends from the inner surface of the handle partially through the handle.

13. The fixed blade knife as in claim 12, wherein the handle comprises a left scale and a right scale on opposite sides of the tang.

14. The fixed blade knife as in claim 12, wherein the bolster comprises a left bolster and a right bolster on opposite sides of the tang.

15. The fixed blade knife as in claim 12, wherein the means for releasably connecting the bolster to the handle prevents longitudinal movement of the bolster with respect to the handle.

16. The fixed blade knife as in claim 12, wherein the means for releasably connecting the bolster to the handle comprises a tab extending from the bolster.

17. The fixed blade knife as in claim 12, further comprising a means for releasably connecting the bolster to the tang of the blade.

* * * * *